March 10, 1931.  W. WOLFF ET AL  1,795,919
PORTABLE POWER HACK SAW
Filed July 10, 1928    5 Sheets-Sheet 1

Inventor
William Wolff and
Ernest Wolff
By Poppet Powers
Attorneys

March 10, 1931. W. WOLFF ET AL 1,795,919
PORTABLE POWER HACK SAW
Filed July 10, 1928 5 Sheets-Sheet 4

Inventor
William Wolff and
Ernest Wolff
By Poppe & Powers
Attorneys

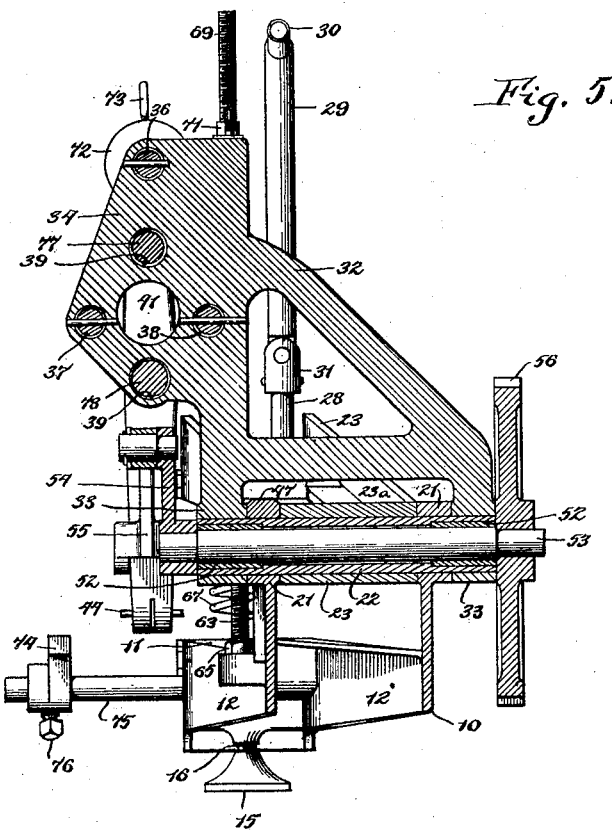

Patented Mar. 10, 1931

1,795,919

UNITED STATES PATENT OFFICE

WILLIAM WOLFF AND ERNST WOLFF, OF BUFFALO, NEW YORK

PORTABLE POWER HACK SAW

Application filed July 10, 1928. Serial No. 291,652.

This invention relates to a portable power hack saw which is used for sawing metal bars, tubing and the like and which can be readily moved about the shop or factory for use in the different departments, thereby effecting a saving in time and labor by avoiding the necessity of moving all of the stock to be sawed to a stationary hack saw.

The principal object of this invention is to provide a light portable hack saw which can be readily moved from place to place as conditions require and which is strong and durable in construction and may be used continuously without getting out of order.

Another object is to provide such a hack saw which is adapted to saw metal pieces of widely varying proportions and which is quickly adjusted to accommodate various sized pieces.

Another aim is to provide such a hack saw in which a simple and reliable lock holds the hack saw in an elevated inoperative position and in which suitable provision is made for yieldingly holding the saw blade against the work when the saw is being operated.

A further object is to provide a jaw which will support the work in different relations to the path of movement of the saw blade and thereby cause the full extent of the saw blade to be used.

A further aim is to simplify the construction and operation of the machine to permit of its being marketed at a low cost, and to render all parts accessible so as to facilitate repairs.

Figure 1:
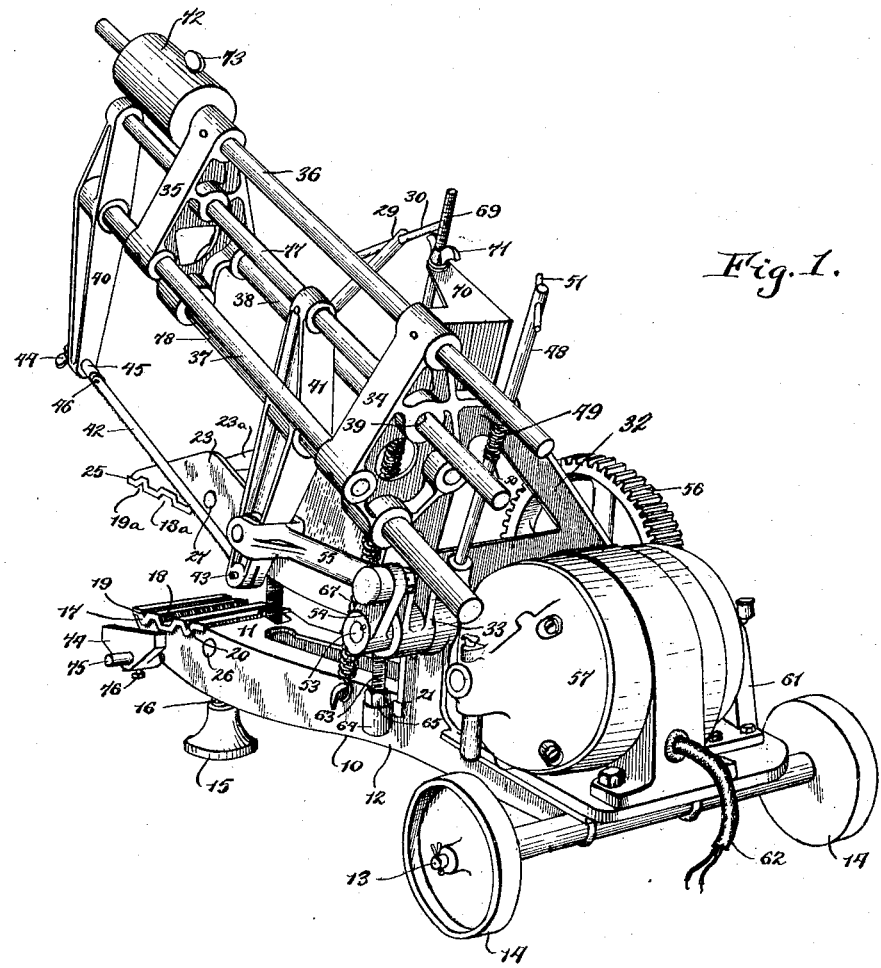
Figure 2:
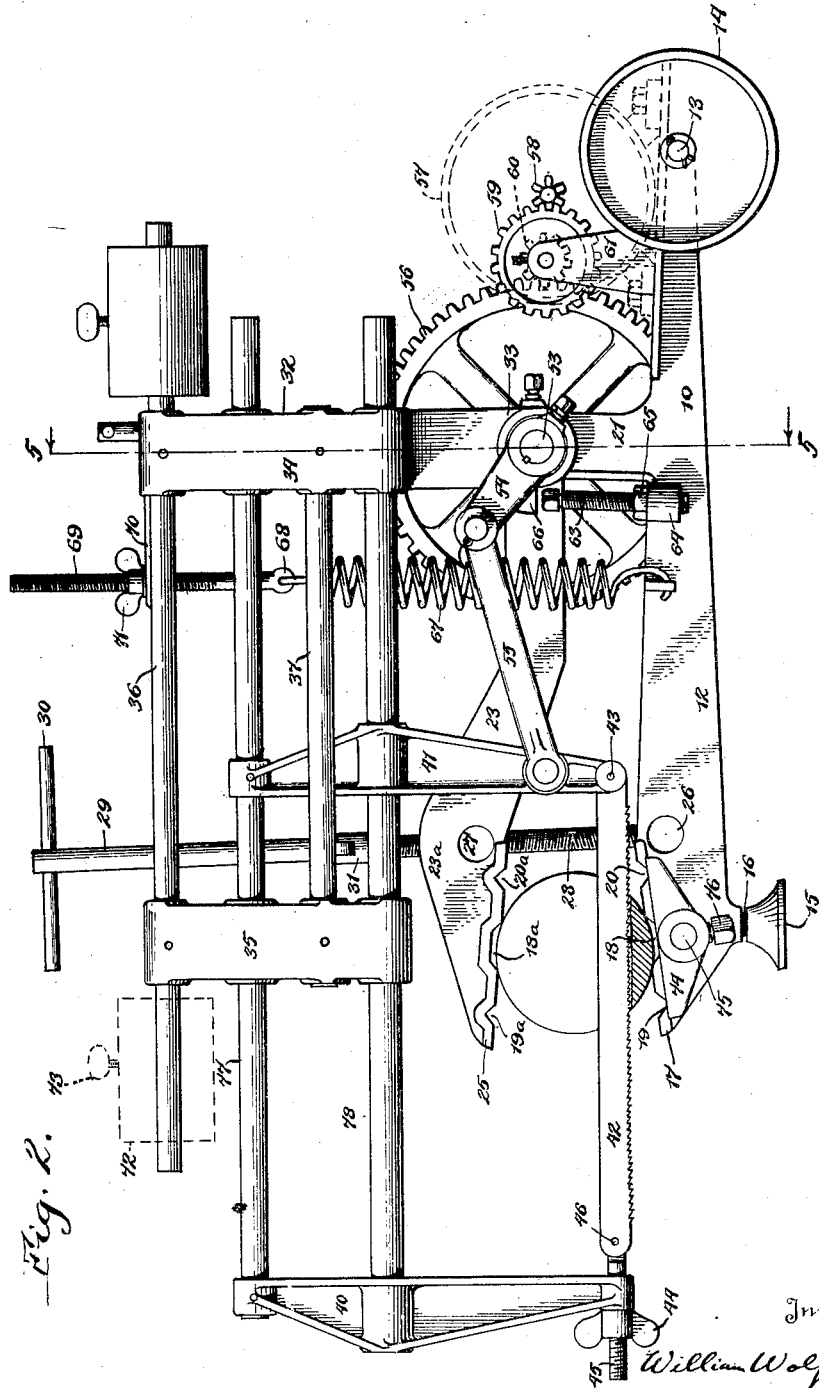
Figure 3:
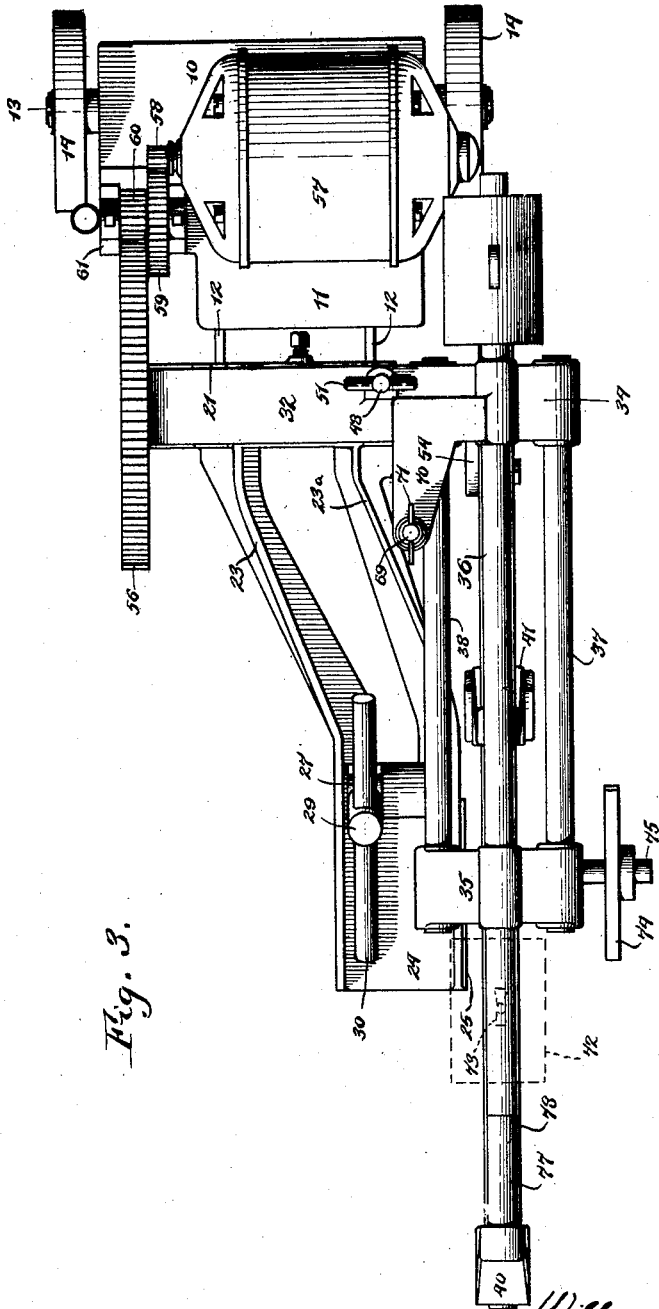
Figure 4:
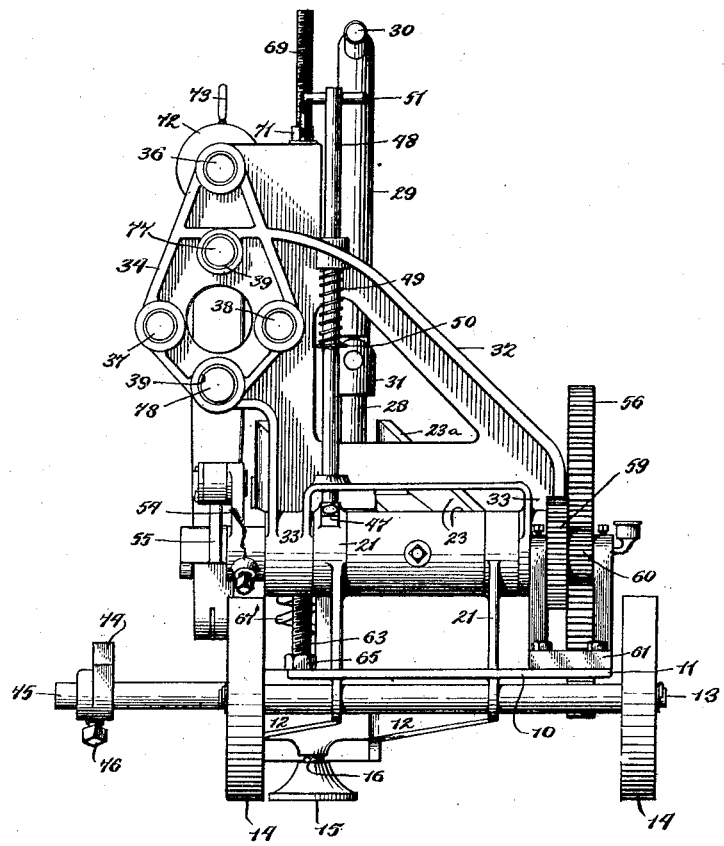

In the accompanying drawings:

Figure 1 is a perspective view of a portable hack saw embodying the invention. Figure 2 is a side elevation thereof. Figure 3 is a top plan view thereof. Figure 4 is a rear view thereof showing the motor removed. Figure 5 is a vertical transverse section taken on line 5—5, Fig. 2.

Similar reference numerals refer to like parts in each of the figures of the drawings.

The hack saw mechanism is mounted on a base 10 which includes a flat upper portion 11 and vertical side webs 12. The rear end of this base is supported on an axle 13 having wheels 14 and the front end is supported by an adjustable foot 15 which is screwed onto a vertical screw 16 thereby permitting the front end of the base to be adjusted to any desired height. When it is desired to move the portable hack saw to another part of the shop or plant, the front end of the hack saw supported by the foot 15 may be lifted and the machine readily wheeled to the new location. The front end of the base 10 also forms the lower jaw of the pair of jaws which grip or clamp the article being sawed, and for this purpose a plate 17 is formed integrally with the base at the front end of the same, this plate having a channeled upper surface forming a large transverse central channel 18, and smaller V-shaped channels 19 and 20 on opposite sides thereof for a purpose which will presently appear.

Near the center of the base 10 and on opposite sides thereof two integrally formed standards 21 are provided which carry a rotatable transverse sleeve 22 at their upper ends. On this sleeve between the standards 21 is rotatably mounted the inner end of the upper movable jaw 23 which is preferably of skeleton form and includes two arms 23—a which are joined at their outer ends by a web 24. On the under side of this web an upper gripping plate 25 is formed integrally with the web 24 and the under side of this plate is corrugated to form transverse channels 18—a, 19—a and 20—a corresponding to the channels provided in the lower gripping plate 17.

To move the upper jaw toward and from the stationary lower jaw for the purpose of securely gripping the piece being sawed, a lower transverse nut 26 is rotatably mounted in the outer end of the base 10, and a similar transverse nut 27 is rotatably mounted in the upper jaw 23, these nuts being engaged by a double acting screw 28 which upon being turned in one direction draws the upper nut and upper jaw toward the lower jaw and when turned in the opposite direction separates the jaws. For convenience in manipulating this screw a handle 29 having a transverse hand piece 30 is secured to the upper end of the screw 28 by a universal connection 31.

The carrier which supports the saw frame for reciprocating movement is mounted on a vertical bracket 32 which has a pair of downwardly extending arms 33, these arms as best shown in Fig. 5 being rotatably mounted on the sleeve 22 outside of the standards 21. At its upper end this bracket 32 is formed to provide the rear head 34 of this carrier and a similar front head 35 is supported from the rear head by three rods comprising an upper rod 36 and two lower rods 37 and 38, these lower rods being arranged on opposite sides of the center lines of the heads. Each of these rods 36, 37 and 38 is secured to both the front and the rear heads 34 and 35 by pins or otherwise and thereby form with these heads a rigid structure for supporting the saw frame.

The saw frame includes an upper rod 77 and a lower rod 78, these rods being in vertical alinement and being slidingly supported in slideways 39 provided in the front and rear heads 35 and 34 of the saw frame supporting structure. The sliding bars 77 and 78 extend through the front head 35 and a vertical saw bar 40 is pinned or otherwise fastened to the front ends of these rods. The rear saw bar 41 is similarly pinned to each of the sliding rods between the front and rear heads 37 and 38. Each of these bars extends downwardly and at their lower ends carry the hack saw blade 42. This blade is secured in the usual manner to a pin 43 in the rear saw bar and is held taut by a wing nut 44 cooperating with a screw 45 which has a pin 46 to which the front end of the hack saw blade is secured. From the foregoing it is apparent that since the saw frame is carried by the bracket 32, the entire saw frame, carrier and bracket swing about the sleeve 22 and the saw is therefore readily lifted after it has completed its sawing operation or when it is desired to place a piece of material between the jaws and under the saw blade preparatory to sawing the same.

To hold the saw in its elevated position shown in Fig. 1, either while the saw is running or when the machine is inoperative, a catch 47 is formed on the upper end of one of the standards 21 and is engaged by a latch bar 48 which is mounted on the bracket 32. This latch bar extends upwardly through slideways provided in the bracket and is held against the standard by a spring 49 which is interposed between the adjacent part of the bracket and a cross pin 50 in the latch rod. When the saw frame is raised, the latch rod 48 travels over the catch 47 and upon releasing the saw frame, the latch rod engages the abrupt rear face of the catch 47, and holds the saw frame in an elevated position. To release the saw frame, the latch rod is manually raised by means of a handle 51 arranged at the top of this rod and the saw frame is therefore permitted to be lowered. To limit the downward movement of the saw and thereby prevent the saw from engaging a part of the machine, a vertical stop screw 63 is mounted in a boss 64 on the base 10 and is held in its adjusted position by a lock nut 65. The upper end of this stop screw engages a lug or shoulder 66 formed on the front side of the bracket 32. This stop screw is preferably adjusted to permit the saw blade to drop slightly after it has cut through the piece clamped against the lower jaw.

Journaled within bearings 52 and arranged within the sleeve 22 is a drive shaft 53. To one end of this drive shaft is suitably secured a crank 54 which drives a link 55. The other end of this link is pivotally connected to the rear bar 41 of the saw frame so that as the drive shaft 53 is turned, the saw frame is reciprocated. The other end of this drive shaft 53 carries a large gear 56 which is driven from an electric motor 57 through a train of gears comprising a pinion 58 on the motor shaft, a gear 59 and a pinion 60 which is formed integrally with the gear 59 and meshes with the large gear 56. The gear and pinion 59 and 60 are preferably mounted in a yoke 61. Power to drive the motor is preferably provided through an extension cord 62 so that the hack saw may be moved around without disturbing its electrical connections.

To facilitate the sawing operation, yielding downward pressure is applied to the saw frame by a spring 67 which is secured at its lower end to the base 10 and at its upper end is secured to an eye 68 in the lower end of a tension adjusting screw 69. This screw passes through an extension 70 provided on the bracket 32 and the tension of the spring is adjusted by a wing nut 71 bearing against this extension. To exert additional downward pressure, the upper fixed rod 36 is extended beyond the front head 35 and carries a sliding weight 72 which is held in its adjusted position by a set screw 73.

The piece of metal being sawed off is supported by a rest 74 mounted on the end of a rod 75 which projects laterally from the front end of the lower jaw or base 10. This rest is sufficiently wide to engage the under sides of pieces which are clamped in the channels 18 and 18—a, 19 and 19—a or 20 and 20—a and is held in position by a set screw 76.

If a large shaft or piece of metal, such as shown in Fig. 2, is to be sawed, the same is held in the large central channels 18, 18—a of the gripping plates, 25 and 17 of the upper and lower jaws and as these channels are disposed in the center of the line of the movement of the saw blade, the teeth at the center of the saw are used. When, however, smaller stock is being cut up, the pieces may be held between the channels 19, 19—a, in which position the teeth at the front end of the saw will be used, or the piece may be held in the channels 20, 20—a, in which case the teeth at the rear of the saw will be used. By this means, the full cutting extent of the saw may be used and the saw worn evenly thereby obtaining the maximum use of the saw blade and necessitating less frequent renewals.

In sawing certain materials, such, for example, as tubing having a thin wall, it is essential that the saw bear very lightly upon the work, since if the full pressure of the saw frame, weight and tension spring were placed on the saw the work would be torn and the saw blade broken. In order to counterbalance the weight of the saw frame when sawing such material, the upper saw frame rod 36 is extended rearwardly from the head 34 and on this rearwardly projecting end, as shown in Figs. 2 and 3, is placed the weight 72, which, for this purpose is removed from the front end of the rod 36. Inasmuch as the weight in this position is in rear of the pivotal support for the saw frame, the same acts as a counterweight and tends to lift the saw frame and counterbalance the same so as to reduce the pressure on the work. The weight 72 acting as a counterweight is adjustable in the same manner as when acting as a pressure weight.

As a whole this invention provides a power hack saw which is light and may be readily and conveniently transported from place to place; it is durable and will withstand severe usage and constant service; it is inexpensive in construction and can be easily repaired; and will operate efficiently to saw any pieces of metal such as are sawed by stationary power hack saws.

We claim as our invention:

1. A hack saw including a base, a transverse sleeve carried by said base, an upwardly projecting bracket movably mounted on said sleeve, a drive shaft journaled in said sleeve, a saw frame carried by said bracket and a clamping jaw pivotally mounted on said sleeve to swing concentrically with said crank shaft, and means for reciprocating said saw frame through motion derived from said drive shaft.

2. A hack saw including a base, a transverse drive shaft, a saw frame mounted for reciprocating movement relative to said base, means for reciprocating said saw frame through motion derived from said drive shaft, and a clamping jaw mounted to swing concentrically with said drive shaft and extending forwardly therefrom, said jaw and base cooperating to hold the article being sawed therebetween.

3. A hack saw including a base, a transverse sleeve carried by said base, a drive shaft journaled in said sleeve, a saw frame mounted for reciprocatory movement relative to said base, means for reciprocating said saw frame through motion derived from said drive shaft, and a movable clamping jaw mounted on said sleeve and extending forwardly therefrom, said jaw and base cooperating to hold the article being sawed therebetween.

4. A hack saw including a base, a transverse sleeve carried by said base, a drive shaft journaled in said sleeve, a bracket movably mounted on said sleeve, a reciprocating saw frame carried by said bracket, means for reciprocating said saw frame through motion derived from said drive shaft, and a movable clamping jaw mounted on said sleeve and extending forwardly therefrom, said jaw and base cooperating to hold the article being sawed therebetween.

5. A hack saw including a base, a pair of standards rising from said base, a sleeve carried by said standards, a movable bracket mounted on said sleeve exteriorly of said standards, a reciprocating saw frame carried by said bracket, a drive shaft journaled in said sleeve, means for reciprocating said saw frame through motion derived from said drive shaft, and a movable clamping jaw mounted on said sleeve between said standards and extending forwardly therefrom, said jaw and base cooperating to hold the article being sawed therebetween.

In testimony whereof we affix our signatures.

WILLIAM WOLFF.
ERNST WOLFF.